(12) United States Patent
Strawn et al.

(10) Patent No.: US 7,499,060 B2
(45) Date of Patent: Mar. 3, 2009

(54) ROBUST INTERACTIVE COLOR EDITING

(75) Inventors: Devon Lyn Strawn, Seattle, WA (US);
Eric Joel Stollnitz, Seattle, WA (US);
Henry A. Sowizral, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 803 days.

(21) Appl. No.: 11/085,501

(22) Filed: Mar. 21, 2005

(65) Prior Publication Data
US 2006/0209324 A1 Sep. 21, 2006

(51) Int. Cl.
*G09G 5/02* (2006.01)
(52) U.S. Cl. .................. 345/601; 345/600; 345/605
(58) Field of Classification Search ............ 345/600, 345/604, 601
See application file for complete search history.

(56) References Cited

U.S. PATENT DOCUMENTS

| | | | | |
|---|---|---|---|---|
| 5,371,844 A * | 12/1994 | Andrew et al. | ............ | 715/747 |
| 5,452,017 A * | 9/1995 | Hickman | ............ | 348/646 |
| 5,861,871 A * | 1/1999 | Venable | ............ | 708/200 |
| 6,246,396 B1 * | 6/2001 | Gibson et al. | ............ | 345/604 |
| 6,522,427 B1 * | 2/2003 | Bhattacharjya et al. | ...... | 358/1.9 |
| 6,782,125 B2 * | 8/2004 | Lee et al. | ............ | 382/162 |
| 7,130,480 B2 * | 10/2006 | Betrisey et al. | ............ | 382/260 |
| 2006/0164556 A1 * | 7/2006 | Samadani et al. | ........... | 348/649 |

OTHER PUBLICATIONS

Nayak et al., Self-Induced Color Correction for Skin Tracking under varying Illumination, IEEE 2003, pp. III-1009-III-1012.*

* cited by examiner

*Primary Examiner*—M Good Johnson
(74) *Attorney, Agent, or Firm*—Woodcock Washburn LLP (57) ABSTRACT

A method of converting between color spaces where color components are cached when they are well-defined after color space conversion. When the components become undefined after conversion, the cached values are used instead of using an arbitrary default value. The resulting color editing system is "robust" in that it matches users' expectations, shielding them from surprising glitches introduced by the user of the arbitrary values for undefined color components.

16 Claims, 6 Drawing Sheets
(3 of 6 Drawing Sheet(s) Filed in Color)

ROBUST INTERACTIVE COLOR EDITING

FIELD OF THE INVENTION

This invention relates in general to the field of graphics editing. More particularly, this invention relates to a system and method for converting between color spaces that preserves well-defined color components when converting from a first to a second color space.

BACKGROUND OF THE INVENTION

Figure 1:
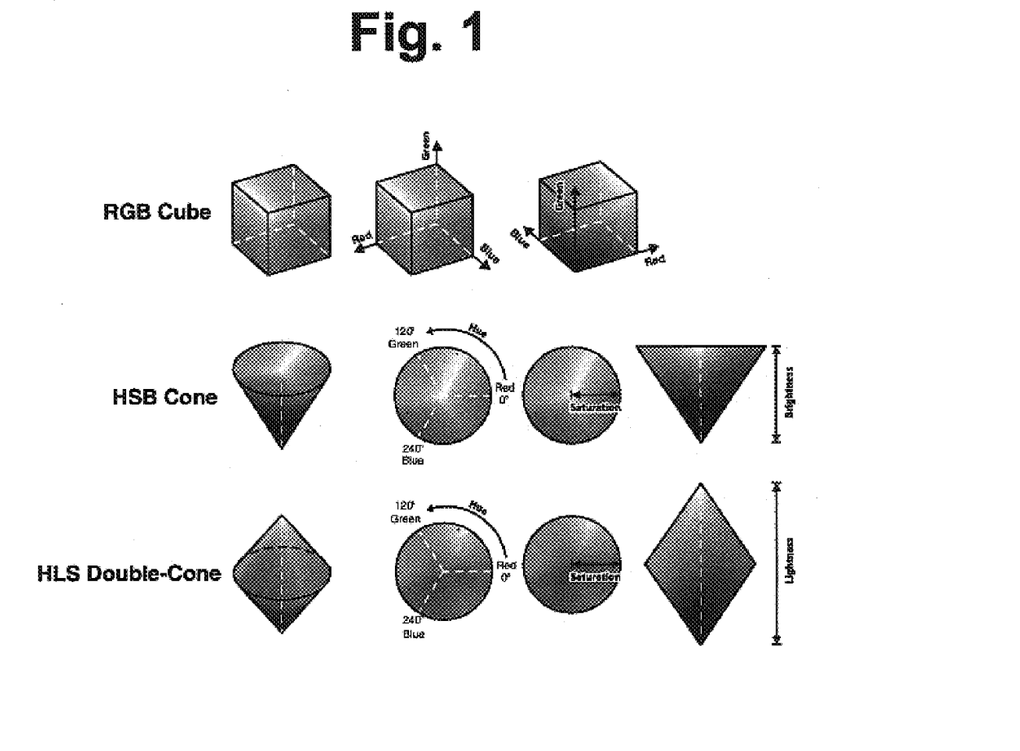
FIG. 1 is a diagram of exemplary color spaces.

In graphical applications, colors are specified using controls that reflect the values of color components in various color spaces. Typically, the resulting color is stored in terms of a single canonical color space. FIG. 1 illustrates three exemplary colors spaces: RGB Cube, HSB Cone and HLS Double-cone. Other color spaces exist and are known by those of ordinary skill in the art, however these are not shown in FIG. 1. A color editor control may convert a color between color spaces to allow a user to edit the canonical color in terms of the differing color spaces.

A side effect of the conversion between color spaces is that individual components may be defined in the original space, but undefined in a target color space, depending on the value of the input color. For example, "black" represented in the RGB color space is (0,0,0). The equivalent color expressed in the HSB color space has a well-defined brightness component but undefined hue and saturation components.

Figure 2:
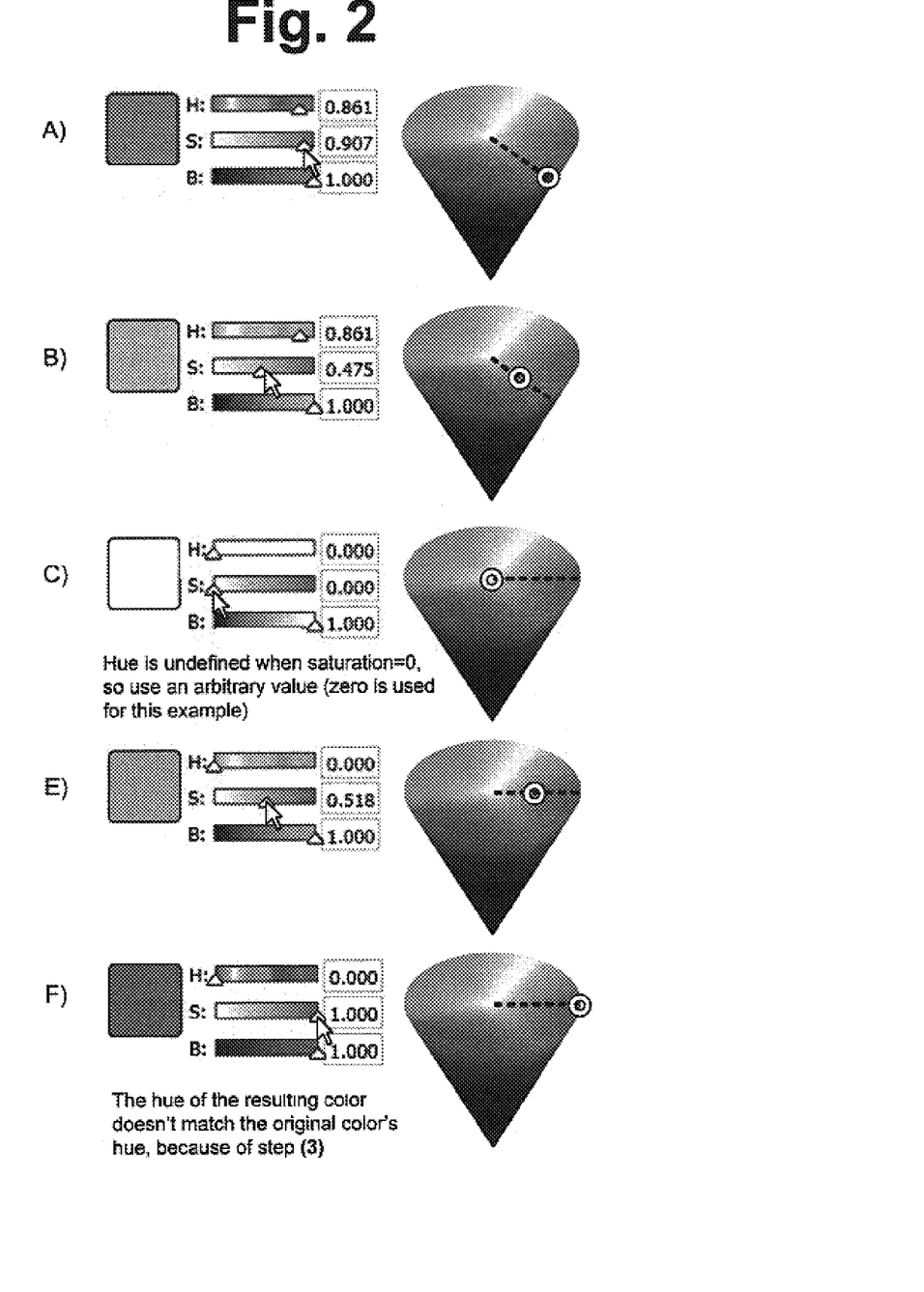
FIG. 2 illustrates editing within a color space in accordance with the prior art.

A simplistic approach to this problem may be to convert from RGB to HSB and fill-in arbitrary default values for the undefined hue and saturation components. However, the user may have already specified values for these components that are expected to be preserved, even if the components are undefined. FIG. 2 illustrates the problem that results from this simplistic, non-robust approach. In the HSB color space, when the user decreases saturation to zero (see, steps A)-C)), the original hue value is discarded due to an ambiguous conversion. This unexpected behavior is problematic and an inconvenience because as the user moves the saturation level higher (see, steps D) and E)), the hue remains at the arbitrary level assigned by the color editor in step C) (in this case 0). Thus, while only saturation is modified in steps A) and E), hue is changed in step C) and the user is unable to return to the original color in step A).

Accordingly, there is a need for a system that retains values of color components when they are well-defined after color space conversion. When the components are undefined after conversion, the retained values may be used instead of simply choosing an arbitrary default value. The present invention provides such a solution.

SUMMARY OF THE INVENTION

The present invention is directed to methods of converting between color spaces where color components are cached when they are well-defined after color space conversion. When the components become undefined after conversion, the cached values are used instead of using an arbitrary default value. The resulting color editing system is "robust" in that it matches users' expectations, shielding them from surprising glitches introduced by the use of arbitrary values for undefined color components.

Additional features and advantages of the invention will be made apparent from the following detailed description of illustrative embodiments that proceeds with reference to the accompanying drawings.

BRIEF DESCRIPTION OF THE DRAWINGS

The file of this patent contains at least one drawing/photograph executed in color. Copies of this patent with color drawing(s)/photograph(s) will be provided by the Office upon request and payment of the necessary fee.

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 3:
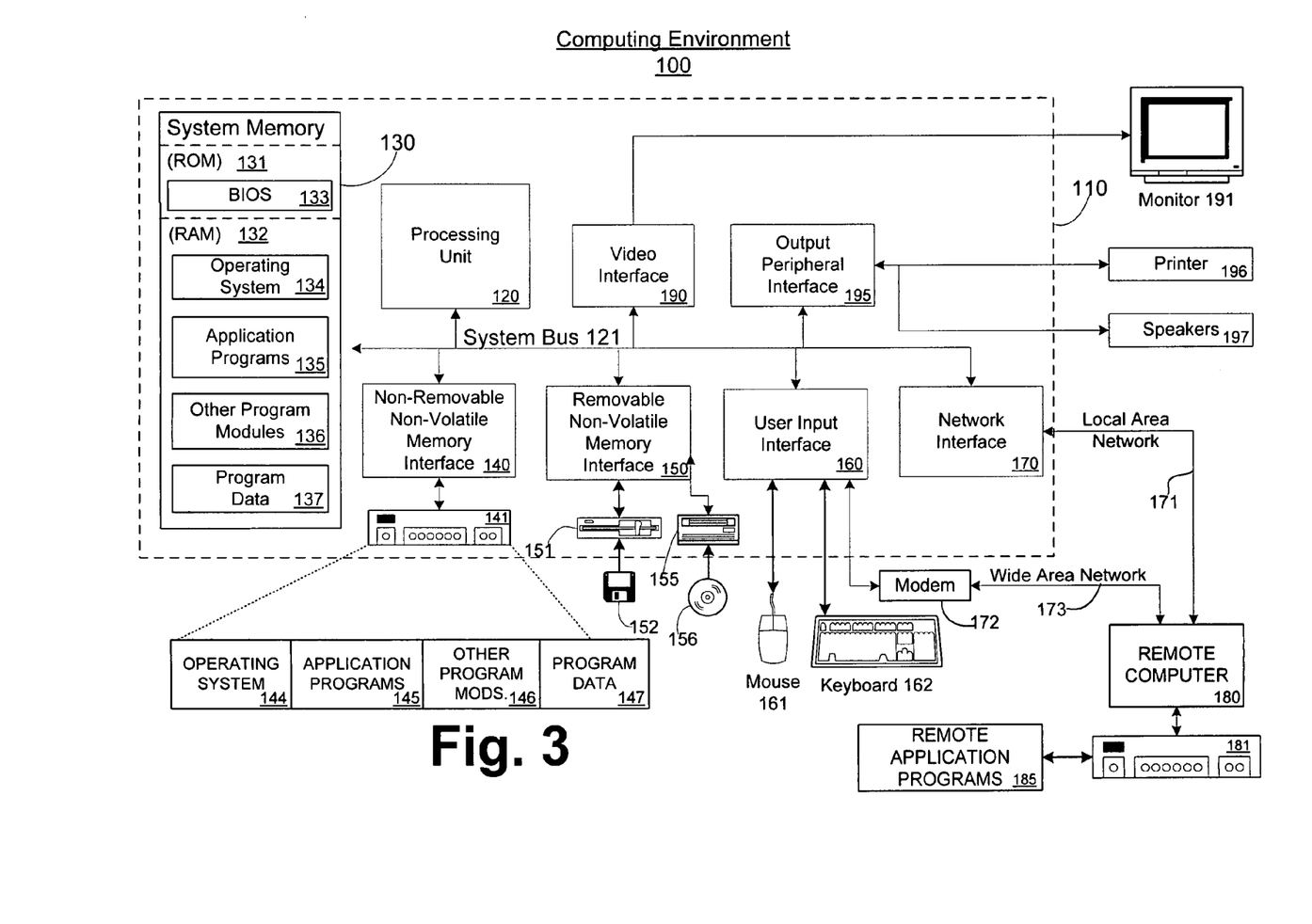
FIG. 3 is a block diagram showing an exemplary computing environment in which aspects of the invention may be implemented.

FIG. 3 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 3, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/non-volatile computer storage media. By way of example only, FIG. 3 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Exemplary Embodiments of Robust Interactive Color Editing

The processes of the present invention are described with reference to FIGS. 4-6. Generally, the parameters are:
1. A canonical color space.
2. A color space to convert to (i.e., the "display" color space).
3. A color conversion process.
4. A caching mechanism.

Figure 4:
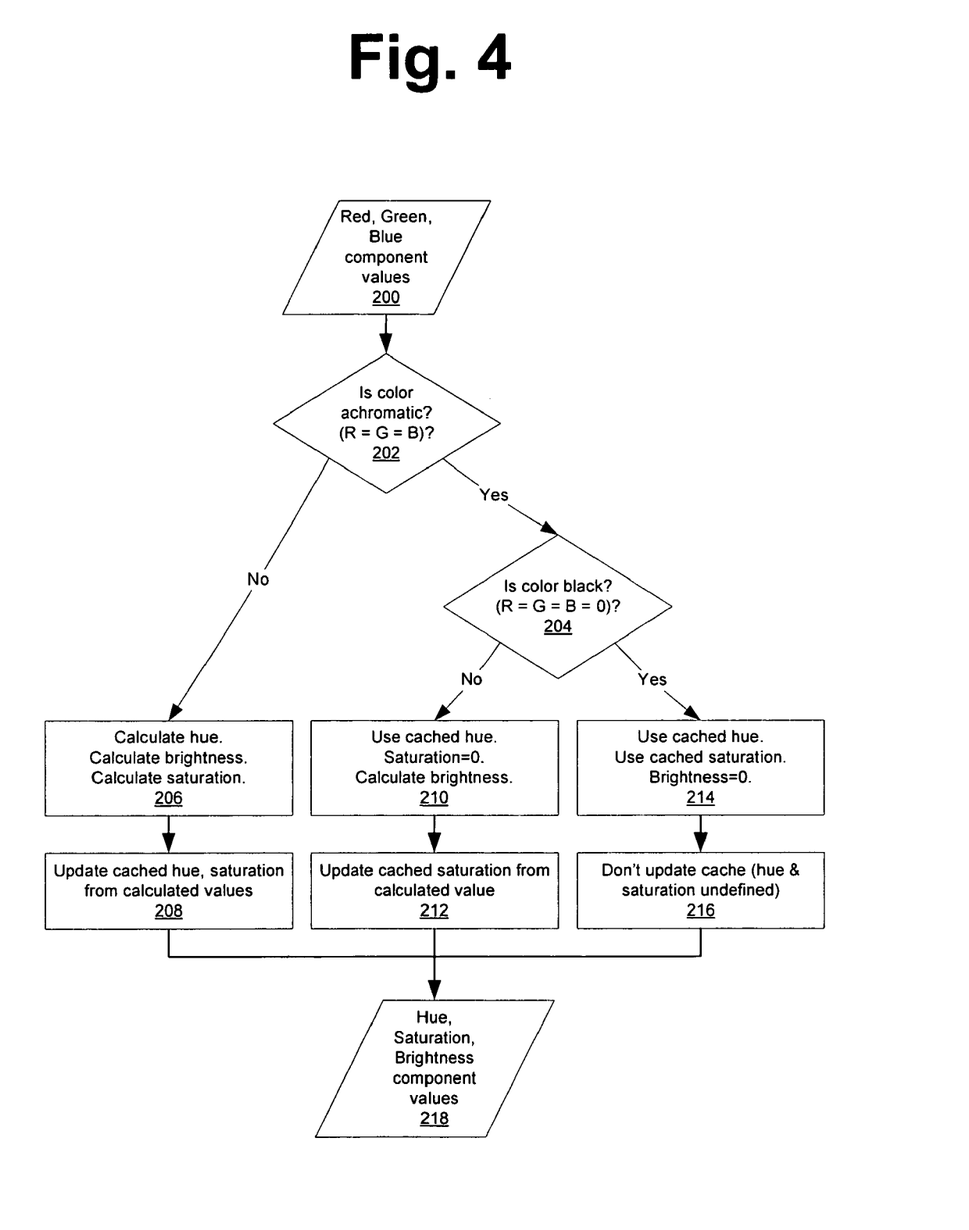
FIG. 4 illustrates the process of converting from the RGB to HSB color spaces in accordance with the present invention.

Referring now to FIG. 4, there is illustrated the process of converting from RGB to HSB, while maintaining well-defined color values. As used herein, "well-defined" means that a particular color is defined unambiguously by a unique color space component triple (i.e., the H, S and B values) in that space. At step 200, the RGB component values are input. At step 202 it is determined if the RGB values are achromatic. If no, then at step 206, the hue, brightness and saturation values are calculated according to a well known conversion. Because this is a well-defined color value, the new HSB values are cached at step 208. At step 218, the HSB component values are returned to the user.

If at step 202 the result is yes, then at step 204 it is determined if the color is black (R=G=B=0). If not, then at step 210, the cached value for hue is used, saturation is set to zero and brightness is calculated. At step 212, the cached saturation value is updated based on the result of step 210 and the HSB component values are returned at step 218. If the color is black at step 204, then the cached hue and saturation values are used and brightness is set to zero at step 214. The cached values are not updated because of this condition (step 216) and the resulting color component values are returned at step 218.

Figure 5:
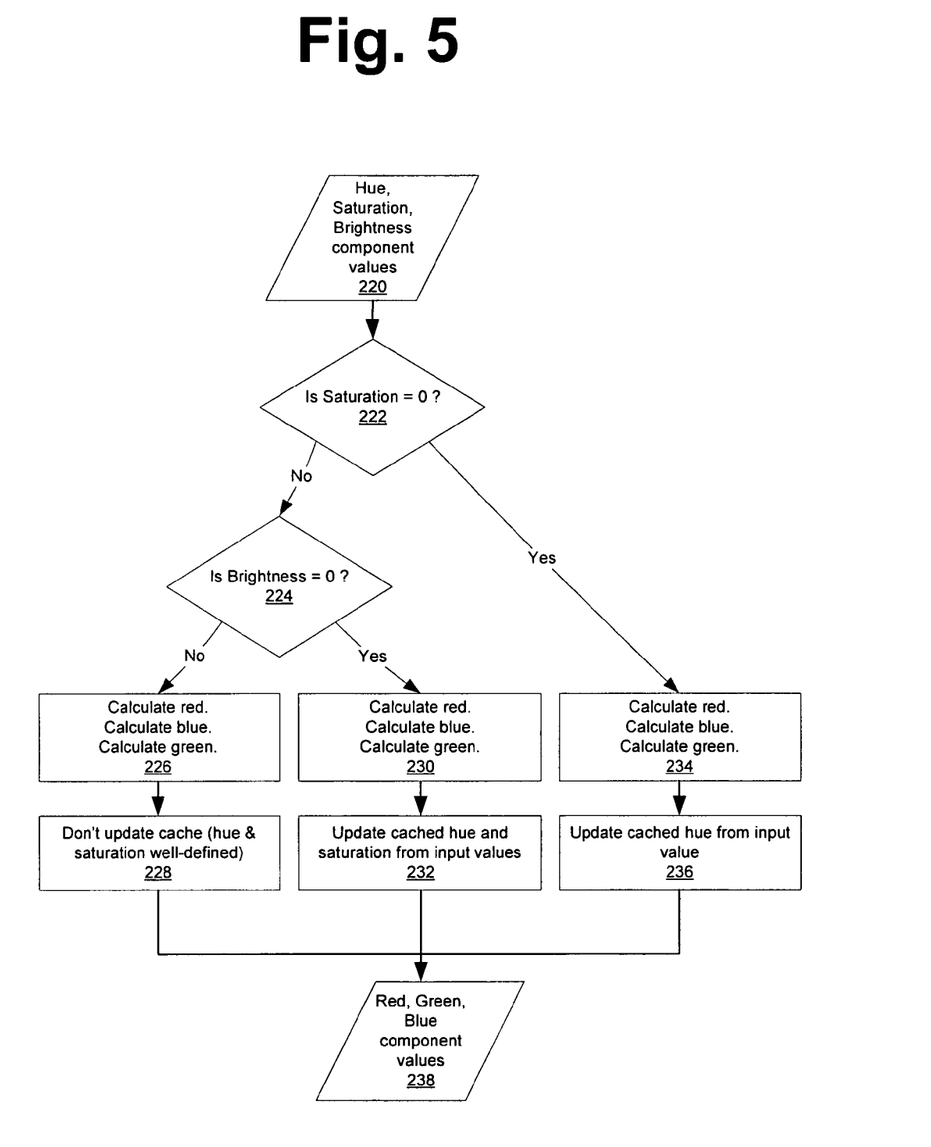
FIG. 5 illustrates the process of converting from the HSB to RGB color spaces in accordance with the present invention.

Referring now to FIG. 5, there is illustrated the process of converting from HSB to RGB, while maintaining well-defined color values. At step 220, the HSB component values are input. At step 222 it is determined if the saturation value is zero. If yes, then at step 234, the red, green and blue component values are calculated according to a well known conversion. Because this is a well-defined color value, the new RGB values are cached at step 236. At step 238, the RGB component values are returned to the user.

If at step 222 the result is no, then at step 224 it is determined if the brightness is zero. If yes, then at step 230, the red, green and blue component values are calculated. At step 232, the cached hue and saturation values are from the input values at step 220. The RGB component values are then returned at step 238. If the brightness is not zero at step 224, then the red, green and blue component values are calculated at step 226. However, the cached values are not updated because of this condition (step 224) and the resulting RGB color component values are returned at step 238.

Thus, the present invention caches a most-recent well-defined value for color components and uses these when:
1. A color component becomes undefined after being well-defined: use the cached values for the undefined component instead of an arbitrary default value.
2. A color component becomes well-defined after being undefined: use the cached values for the component when the color conversion moves away from a singularity Several caching mechanisms are possible. For example, a vector of approach into singular points in the converted color space may be stored and used to reconstitute the components once the converted color moves away from a singular point. The preferred implementation simply caches component values.

Figure 6:
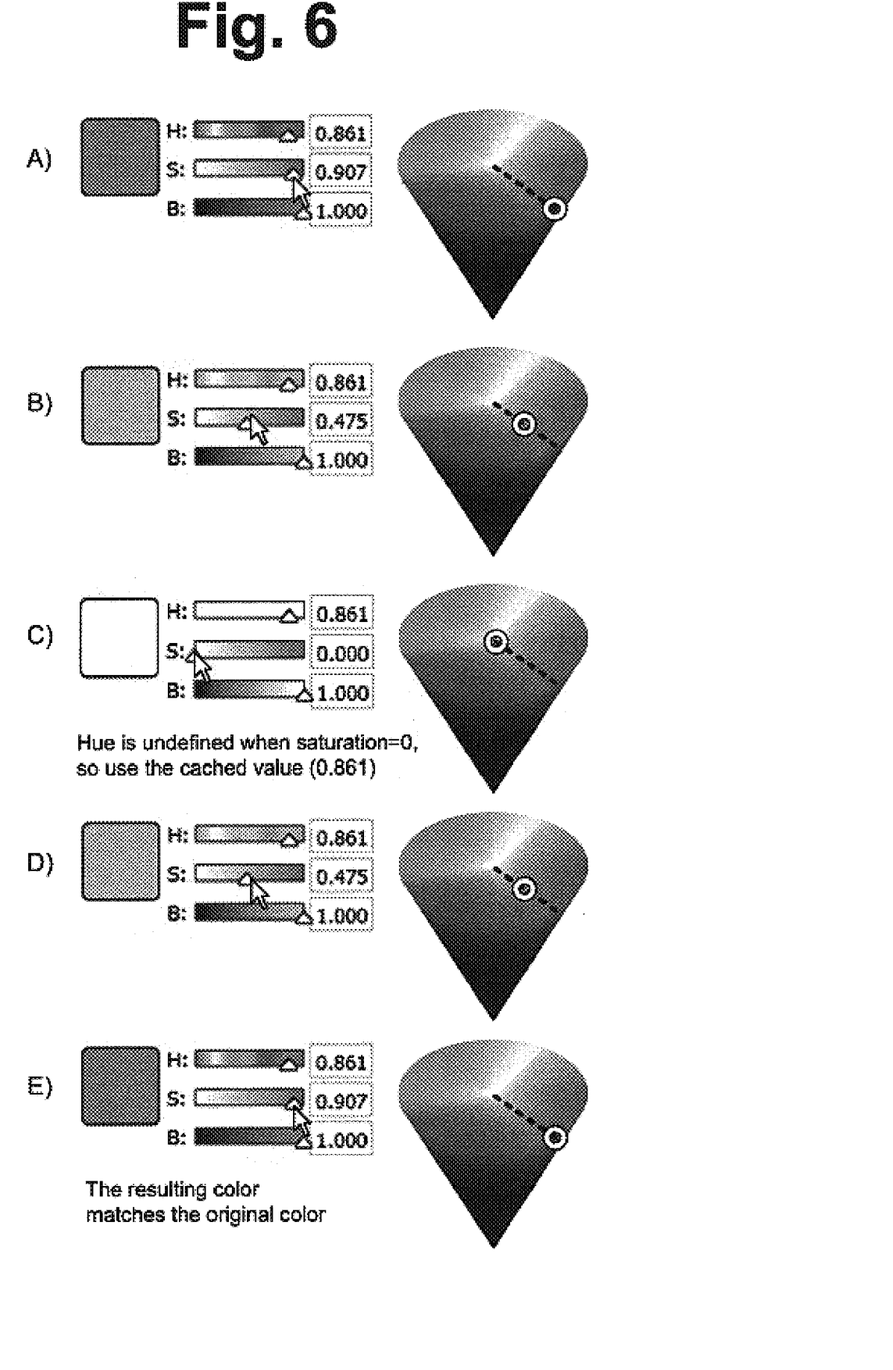
FIG. 6 illustrates editing within a color space in accordance with the present invention.

Referring now to FIG. 6, there is the color space conversion of FIG. 2 showing color editing using the present invention. FIG. 6 illustrates the improvements of the present invention result from a robust approach. In the HSB color space, when the user decreases saturation to zero (see, steps A)-C)), the original hue value is discarded due to the ambiguous conversion. However, in accordance with the present invention, the well-defined cached value for hue is used. As the user moves the saturation level higher (see, steps D) and E)), the cached hue value is used and, eventually, the user is able to return to the original color in step A).

Although the present invention has been described in exemplary terms with respect to a conversion between RGB and HSB (and vice versa), other conversions from different color spaces are contemplated by the appended claims.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of converting from a first color space to a second color space using a processor, comprising:
receiving first component values related to said first color space on the processor, wherein said first component values are red, blue and green component values;
evaluating, by the processor, said first component values to determine if they represent well-defined component values in at least one of said first color space and said second color space, wherein said well-defined component values comprise hue, saturation and brightness values;
converting, by the processor, from said first color space to said second color space to determine second component values related to said second color space;
caching said well-defined component values in a cache;
determining, by the processor, if said red, blue and green values are equal;
and if not, calculating, by the processor, said hue, saturation and brightness values from said red, blue and green values; and
updating said cache with the calculated hue, saturation and brightness values.

2. The method of claim 1, wherein if said red, blue and green values are equal, said method further comprising:
determining, by the processor, if a color defined by red, blue and green values is black; and if not, calculating, by the processor, a brightness value and updating said cache with said calculated brightness value; and if so, setting a brightness to zero and not updating said cache.

3. The method of claim 1, further comprising using one of said well-defined component values in said cache when one of said first component values or said second component values becomes undefined.

4. The method of claim 1, further comprising using one of said well-defined component values in said cache when one of said first component values or said second component values becomes well-defined after being undefined.

5. A method of converting from a first color space to a second color space using a processor, comprising:
- receiving first component values related to said first color space on the processor;
- evaluating, by the processor, said first component values to determine if they represent well-defined component values in at least one of said first color space and said second color space, wherein said well-defined component values comprise hue, saturation and brightness values;
- converting, by the processor, from said first color space to said second color space to determine second component values related to said second color space;
- caching said well-defined component values in a cache;
- determining, by the processor, if said saturation value is zero;
- and if so, calculating, by the processor, red, blue and green values; and
- updating said cache with said hue value.

6. The method of claim 5, wherein if said saturation is not zero, said method further comprising:
- determining, by the processor, if said brightness value is zero; and
- if so, calculating, by the processor, red, blue and green values and brightness value and updating said cache with said hue and saturation values; and if not, not updating said cache.

7. The method of claim 5, further comprising using one of said well-defined component values in said cache when one of said first component values or said second component values becomes undefined.

8. The method of claim 5, further comprising using one of said well-defined component values in said cache when one of said first component values or said second component values becomes well-defined after being undefined.

9. A computer readable storage medium having stored thereon computer executable instructions for converting from a first color space to a second color space, comprising instructions for:
- receiving first component values related to said first color space, wherein said first component values are red, blue, and green component values;
- evaluating said first component values to determine if they represent well-defined component values in at least one of said first color space and said second color space, wherein said well-defined component values comprise hue, saturation and brightness values;
- converting from said first color space to said second color space to determine second component values related to said second color space;
- caching said well-defined component values in a cache;
- determining if said red, blue and green values are equal;
- and if not, calculating said hue, saturation and brightness values from said red, blue and green values; and
- updating said cache with the calculated hue, saturation and brightness values.

10. The computer readable storage medium of claim 9, wherein if said red, blue and green values are equal, said computer readable medium further comprising instructions for:
- determining if a color defined by red, blue and green values is black; and
- if not, calculating a brightness value and updating said cache with said calculated brightness value; and if so, setting a brightness to zero and not updating said cache.

11. The computer readable storage medium of claim 9, further comprising instructions for using one of said well-defined component values in said cache when one of said first component values or said second component values becomes undefined.

12. The computer readable storage medium of claim 9, further comprising instructions for using one of said well-defined component values in said cache when one of said first component values or said second component values becomes well-defined after being undefined.

13. A computer readable storage medium having stored thereon computer executable instructions for converting from a first color space to a second color space, comprising instructions for:
- receiving first component values related to said first color space;
- evaluating said first component values to determine if they represent well-defined component values in at least one of said first color space and said second color space, wherein said well-defined component values comprise hue, saturation and brightness values;
- converting from said first color space to said second color space to determine second component values related to said second color space;
- caching said well-defined component values in a cache;
- determining if said saturation value is zero;
- and if so, calculating red, blue and green values; and
- updating said cache with said hue value.

14. The computer readable storage medium of claim 13, wherein if said saturation is not zero, said computer readable medium further comprising instructions for:
- determining if said brightness value is zero; and
- if so, calculating red, blue and green values and brightness value and updating said cache with said hue and saturation values; and if not, not updating said cache.

15. The computer readable storage medium of claim 13, further comprising instructions for using one of said well-defined component values in said cache when one of said first component values or said second component values becomes undefined.

16. The computer readable storage medium of claim 13, further comprising instructions for using one of said well-defined component values in said cache when one of said first component values or said second component values becomes well-defined after being undefined.

* * * * *